(12) United States Patent
Siegmund

(10) Patent No.: US 8,166,144 B2
(45) Date of Patent: Apr. 24, 2012

(54) NETWORK IDENTIFICATION AND CONFIGURATION USING NETWORK SIGNATURE

(75) Inventor: Dieter Siegmund, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 11/957,224

(22) Filed: Dec. 14, 2007

(65) Prior Publication Data

US 2009/0006600 A1    Jan. 1, 2009

Related U.S. Application Data

(60) Provisional application No. 60/947,364, filed on Jun. 29, 2007.

(51) Int. Cl.
*G06F 15/173* (2006.01)

(52) U.S. Cl. ........................................ 709/223

(58) Field of Classification Search ............... 709/217, 709/218, 219, 220, 221, 222, 223, 224
See application file for complete search history.

(56) References Cited

U.S. PATENT DOCUMENTS

| | | | | |
|---|---|---|---|---|
| 5,557,748 | A | * | 9/1996 | Norris ........................ 709/220 |
| 6,122,639 | A | * | 9/2000 | Babu et al. ........................ 1/1 |
| 2009/0019141 | A1 | * | 1/2009 | Bush et al. .................... 709/223 |

* cited by examiner

*Primary Examiner* — Joseph Avellino
*Assistant Examiner* — Marshall McLeod
(74) *Attorney, Agent, or Firm* — Fish & Richardson P.C.

(57) ABSTRACT

Methods, computer program products, systems and data structures for generating a signature for a network are described. A network signature may include, for example, network information associated with a network (e.g., IP address, MAC address, domain name, DNS name, routing information, phone number, etc.). A signature of a network that has previously been created can be stored to enable identification of the network in the future and to record parameters, settings, properties and attributes previously used for that network.

22 Claims, 6 Drawing Sheets

NETWORK IDENTIFICATION AND CONFIGURATION USING NETWORK SIGNATURE

CROSS-REFERENCE TO RELATED APPLICATIONS

This application claims priority to U.S. Provisional Patent Application Ser. No. 60/947,364, filed Jun. 29, 2007, entitled "Network Identification and Configuration Using Network Signature", the contents of which are incorporated herein by reference.

TECHNICAL FIELD

This invention relates to management of network devices.

BACKGROUND

The administration of network devices in a network environment, such as network printers, scanners and facsimile machines, is typically a tedious and time consuming task for network users. For example, in commercial businesses, many network management tools require frequent issuance of broadcast messages to network devices on a network to detect new network devices and/or monitor for changes in existing devices. This can significantly generate network traffic and cause network congestion.

SUMMARY

Systems, apparatus, methods and computer program products are described for generating a network signature. A network signature may include, for example, network information associated with a network (e.g., IP address, MAC address, domain name, DNS name, routing information, phone number, etc.). A signature of a network that has previously been created can be stored to enable identification of the network in the future and to record parameters, settings, properties and attributes previously used for that network.

The details of one or more embodiments of the invention are set forth in the accompanying drawings and the description below. Other features, objects, and advantages of the invention will be apparent from the description and drawings, and from the claims.

DETAILED DESCRIPTION

Network Environment

Figure 1:
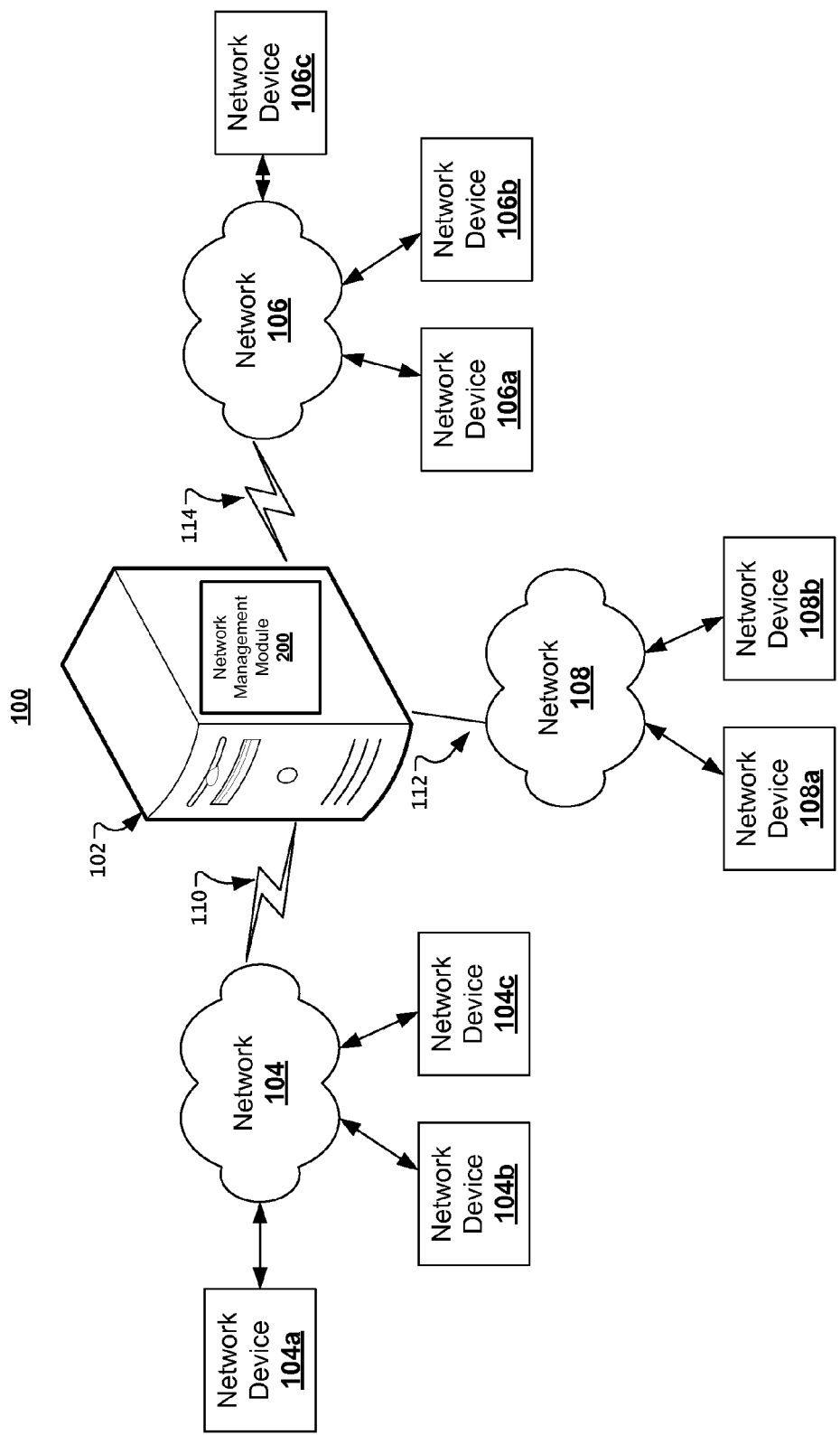
FIG. 1 is an example of a network environment.

FIG. 1 depicts an example of a network environment 100. Referring to FIG. 1, the network environment 100 can facilitate the generation of network signature. As shown, the network environment 100 includes a computing system 102. The computing system 102 may be connected to one or more individual networks 104, 106 and 108. Each network 104, 106 and 108 may be all or a portion of an enterprise or secured network. While illustrated as a single network, each network 104, 106 and 108 may be a continuous network logically divided into various sub-nets or virtual networks without departing from the scope of this disclosure, so long as at least a portion of the network 104, 106 and 108 may facilitate network communication between the computing system 102 and the individual network.

Each network 104, 106 and 108 may be coupled to one or more network devices. For example, network 104 may be coupled to network devices 104a, 104b and 104c; network 106 may be coupled to network devices 106a, 106b and 106c; and network 108 may be coupled to network devices 108a and 108b. The network devices include physical, individual general purpose computing systems, servers, devices or a combination thereof, which can be arranged in a cluster environment. For example, the network devices 104a-104c, 106a-106c and 108a-108b may include workstations, servers (e.g., domain name server (DNS) or hypertext transfer protocol (HTTP) server, etc.), printers, routers, modems, laptops or database systems. The network devices may include network interfaces for supporting communication of the network devices over communication channels 110, 112 and 114 with other devices such as the computing system 102. The network interfaces may utilize protocols such as TCP/IP, HTTP, SNMP, FTP, DHCP, Point-to-Point Protocol (PPP) over Ethernet (PPPoE), and other known network or printing protocols for managing communications with other network devices and/or the computing system 102.

The communication channels 110, 112 and 114 can be of the form of any wireless or wired communication medium or combinations thereof, such as a public switched telephone network (PSTN), a virtual private network (VPN), the Internet, and the like. The computing system 102 may communicate with the network devices over the communication channels 110, 112 and 114 and through the networks 104, 106 and 108.

The network 104, 106 and 108 encompasses any internal or external network, networks, sub-network, or combination thereof operable to facilitate communications between various computing components in the network environment 100. The network 104, 106 and 108 may be used to communicate, for example, Internet Protocol (IP) packets, Frame Relay frames, Asynchronous Transfer Mode (ATM) cells, voice, video, data, and other suitable information to the computing system 102 (and network devices). The network 104, 106 and 108 may include one or more local area networks (LANs), radio access networks (RANs), metropolitan area networks (MANs), wide area networks (WANs), distributed system networks, digital subscriber line (DSL) networks, Ethernet networks, or all or a portion of the global computer network known as the Internet, and/or any other communication system or systems at one or more locations.

Network Management Module

Figure 2:
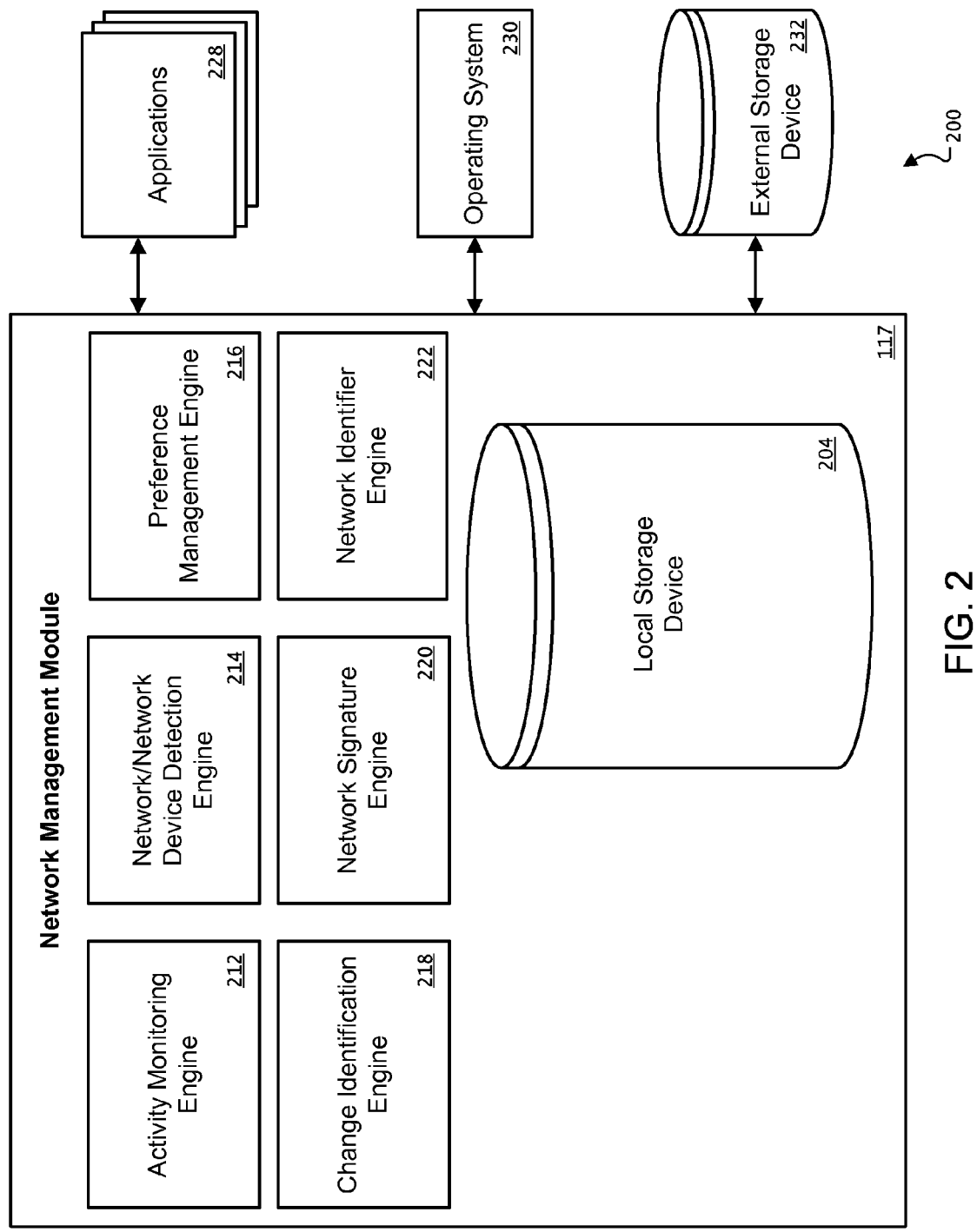
FIG. 2 is a block diagram showing an example architecture of a network management module.

In some implementations, the computing system 102 includes a network management module 200 for managing communications between the computing system 102 and network devices 104a-104c, 106a-106c and 108a-108b. FIG. 2 is a block diagram showing an example architecture of the network management module 200.

Referring to FIG. 2, the network management module 200 may perform one or more network-related functions associated with one or more applications 228. As shown, the network management module 200 includes an activity monitoring engine 212, a network/network device detection engine 214, a preference management engine 216, a change identification engine 218, a network signature engine 220 and a network identifier engine 222.

The activity monitoring engine 212 may monitor, on a scheduled or random basis, user interaction between the computing system 102 and the network devices 104a-104c, 106a-106c and 108a-108b. For example, the activity monitoring engine 212 may monitor user input from a network user of the computing system 102 and determine that the user has submitted a print job to be processed by one of the network devices connected to the computing system 102.

The network/network device detection engine 214 may be used to detect new network devices available on the networks 104, 106 and 108. In some implementations, assuming that a new network device is added to a network and is assigned with an IP address (e.g., by a DHCP server), the network/network device detection engine 214 may add this new network device to an existing network based on, for example, the IP address. Of course, the network/network device detection engine 214 also may employ other device detection techniques for detecting new network devices, including, without limitation, broadcasting messages, pinging through a list of IP addresses, obtaining router tables from associated routers, and performing a DNS lookup.

Once a new network device is added to the network, the network/network device detection engine 214 may obtain network and adaptor configuration information from the new network device. In some implementations, the network and adaptor configuration information may include a MAC addresses and an IP addresses. A Mac address is a unique identification number that is assigned by the manufacturer to a specific network device. For example, a network device can communicate with another network device by sending a packet. The network device transmitting the packet can identify itself by both an IP address (e.g., with subnet mask or gateway IP address) and a MAC address. The network and adaptor configuration information also may include, without limitation, a connection method (e.g., dialup, Ethernet, wireless, VPN, RAS, token ring, infrared etc.), network IP address, network mask, gateway MAC address (e.g., if private IP), connection name (e.g., if dialup), network profile, domain name, other network setting information and the like.

The network/network device detection engine 214 also may obtain device identification information (e.g., device type, make, model, version, etc.) and functional application information (e.g., printing function, routing function, etc.) from the new network device.

In some implementations, during an initial network boot sequence, each network-connected device may communicate with the network management module 200 through a respective network 104, 106 and 108 by sending network parameters such as those discussed above associated with the network-connected device to the network management module 200.

A directory may be created for recording and maintaining network and adaptor configuration information, device identification information and functional application information of the networks (and network devices) to which the computing system 102 is connected. The directory may be stored, for example, in a local storage device 204 or an external storage device 232 for easy access and convenient management. The local storage device 204 also may store one or more directories associated with tracking and managing the functional services supported and provided by the network devices 104a-104c, 106a-106c and 108a-108b.

In some implementations, the local storage device 204 may include a database (not shown) (e.g., relational database, a file system or any other form of persistent storage). In these implementations, network information about the network or networks to which the computing system 102 is connected, as well as the profile of these networks may be stored in the database.

The external storage device 232 can be an internal or external resource, or a combination thereof. Any number of local and/or external storage devices can be used by the network management module 200 for storing network signatures and/or network identifiers. In some implementations, the network management module 200 can view storage devices designated for use in storing network signatures as a single memory bank. In other implementations, the external storage device 232 can be used by the network management module 200 for archiving. Any number of storage devices can be used by the network management module 200. For example, a second external storage device can be used as an overflow repository in the event that the external storage device 232 reaches capacity. In another implementation, different storage devices can be used for storing the network signatures and network identifiers.

The preference management engine 216 specifies one or more operating parameters of the network management module 200. In some implementations, the preference management engine 216 may be used to identify user preference data (e.g., user-specified and/or system default application parameters for the network management module 200). The user preference data may include specific settings, properties, values or attributes for which a particular network or networks or associated network device should be configured. Such user preference data may be incorporated into a signature (as will be discussed in greater detail below) so that the computing system 102 may deploy the same parameters and user preference data when connected to the same network or networks without having the user to manually adjust such parameters and data.

The preference management engine 216 also may execute various applications such as implementing network security measures (e.g., in accordance with IEEE 802.1X specification). The preference management engine 216 also may include driver information for supporting the network devices connected to the networks 104, 106 and 108.

The preference management engine 216 further may generate a list of networks and network devices to which the computing system 102 can be connected. The list also may specify a corresponding signature (and data thereof) for each network. When the computing system 102 is connected to an existing network, the associated signature is retrieved, and settings, parameters, properties and attributes defined in the signature are automatically deployed without user intervention. For example, a default printer may be automatically reconfigured to a specific printer configuration when the signature is effectuated. If desired, a user of the computing system 102 may access (e.g., through a graphical user interface described below) and manipulate the list to, for example, rename a name of a network, or the signature to modify the data defined therein.

The change identification engine 218 can locate specific network parameters and network configuration information to determine if these parameters have been changed. For example, the change identification engine 218 can identify a change in IP address assigned to a network device. As another example, the change identification engine 218 can detect whether the domain name of a network device has been modified. When changes to a network are detected and network information is updated, the change identification engine 218 may pass on the changes to the network signature engine 220 to determine if a new signature should be re-created for the network/network device or modification to an existing signature is necessary.

The network signature engine 220 can generate one or more signatures. A signature may include, for example, network information associated with a network (e.g., IP address, MAC address, domain name, DNS name, routing information, phone number, etc.). In some implementations, the signature also may include network information associated with one or more network devices coupled to the network (e.g., device settings, device types, etc.).

A signature of a network that has previously been created can be stored to enable identification of the network in the future and to record parameters, settings, properties and attributes previously used for that network. For example, when a print job is submitted through network "A" to network printer "A", a signature "A" may be created that identifies network printer "A" as a default printer associated with network "A". Assuming that the default printer has been changed to network printer "B" associated with network "B", when the connection to network "B" is disconnected and the connection to network "A" is re-established, the signature "A" may be retrieved and executed to establish network printer "A" as the default printer without user intervention.

As another example, a signature "B" may be created that defines a TCP window with a window size of 64 kb for network "B", which operates at a data rate of 20 Mbit/s (e.g., FIOS). Assuming that the TCP window size associated with network "A", which operates at a data rate of 1.5 Mbit/s (e.g., DSL), is 32 kb, when the connection to network "A" is disconnected and the connection to network "B" is re-established, the signature "B" may be retrieved and executed to automatically adjust the TCP window from a window size of 32 kb back to a window size of 64 kb without user intervention. Of course, as new networks are identified, new signatures also may be created for each new network.

In some implementations, a graphical user interface (GUI) may be provided by the user(s) of the computing system 102 for managing network signatures. The user interface may include an administrative space, which can include various links and/or other user interface elements for allowing the users to administer (e.g., modify) the created signatures. Particularly, the GUI may be operable to allow the user(s) of the computing system 102 to interface with the network management module 200 for any suitable purpose, such as viewing advertisements. Generally, a GUI provides the particular user with an efficient and user-friendly presentation of data provided by or communicated within network environment 100. The GUI may include one or more customizable frames or views having interactive fields, pull-down lists, and buttons. In some implementations, if the user has previously created a signature, the GUI may be operable to display the signature and associated data in a user-friendly format.

The GUI can be configurable, supporting a combination of tables and graphs (bar, line, pie, status dials, etc.), and may be used to display real-time network data, existing signatures, network identifiers and the like. It should be understood that the term graphical user interface may be used in the singular or in the plural to describe one or more graphical user interfaces and each of the displays of a particular graphical user interface. Indeed, reference to a GUI may indicate a reference to a front-end as well as the particular interface accessible via the network devices. Therefore, the GUI as discussed herein contemplates any graphical user interface, such as a generic web browser or touch screen, that processes information in system 100 and efficiently presents the results to the user.

In some implementations, the network management module 200 runs as a background task on an operating system 230, where the task is generally not visible to a user of the computing system 102. The network management module 200 can be configured to run across multiple user accounts. Other configurations are possible.

In some implementations, the network identifier engine 222 may assign a network identifier to each network signature. Specifically, each signature may be assigned a network identifier. In some implementations, the network identifier and the signature may be functionally equivalent. The network identifier allows identical networks to be grouped (e.g., automatically by the computing system 102 or manually by the user), and be treated as a same cluster. That is, grouping networks may be achieved by assigning a same, unique network identifier to multiple networks. For example, network "A", network "B" and network "C" each may be respectively associated with a signature "A", signature "B", signature "C" but yet be grouped into a same cluster assigned with a single network identifier. By grouping similar networks into a same cluster based on a common network identifier, the network management module 200 effectively avoids unnecessary redundancy and network confusion, and balances the functional support for all network devices among the multiple network management devices based on resource availability and location of each network management device. This also helps to avoid forcing the network management module 200 to track multiple networks that are similar in nature. In some implementations, the network identifier may be used to identify a particular network instead of a signature.

The network identifier (and network signature) can be stored in a transitory memory such as local cache or random access memory ("RAM"), or in a non-transitory memory such as a hard disk. The network identifier and other parameters or properties associated with the network identifier also can be stored (e.g., in a transitory or non-transitory memory). Identifying a network can be performed manually by a user. For example, a user can manually select a network for which a signature is to be generated.

Example Processes

Figure 3A:
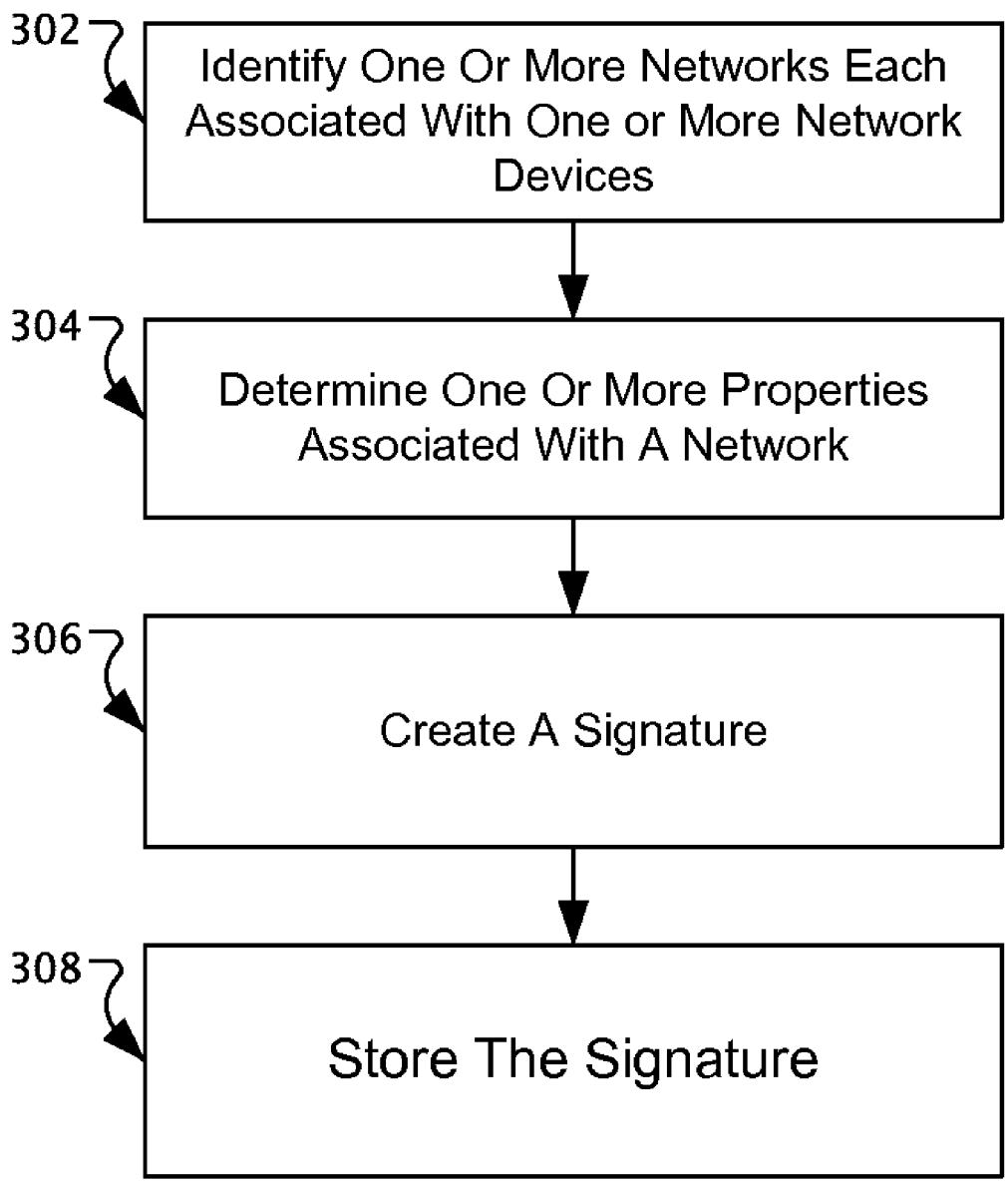
FIG. 3A is a flow diagram showing an example process for creating a signature.

FIG. 3A is a flow diagram showing an example process 300 for creating a signature. The process 300 may be performed, for example, by the network management module 200, and for clarity of presentation, the description that follows uses these as the basis of examples for describing the process 300. However, another module, or combination of modules/engines, also may be used to perform the process 300.

In the example shown, the process 300 begins with identifying one or more networks, where each network is associated with one or more network devices (302). A network device may be a network printer, scanner, copying machine, facsimile machine, router, modem, mobile phone, personal computer, hand-held computing device, multiprocessor system, microprocessor-based or programmable consumer electronic device, minicomputer, mainframe computer, personal digital assistant (PDA), telephone, pager, or any other devices capable of receiving and/or transmitting information.

The process 300 may proceed with determining one or more properties associated with a network and any one of the network devices (304). In some implementations, the one or more properties may include, without limitation, a connection method through which the computing system 102 is connected (e.g., dialup, Ethernet, wireless, VPN, RAS, token ring, infrared etc.), network IP address, network mask, gateway MAC address (e.g., if private IP), connection name (e.g., if dialup), network profile, domain name, other network setting information, device information and the like.

The process 300 then creates a unique signature based on the one or more properties (306), and stores the unique signature (308).

Figure 3B:
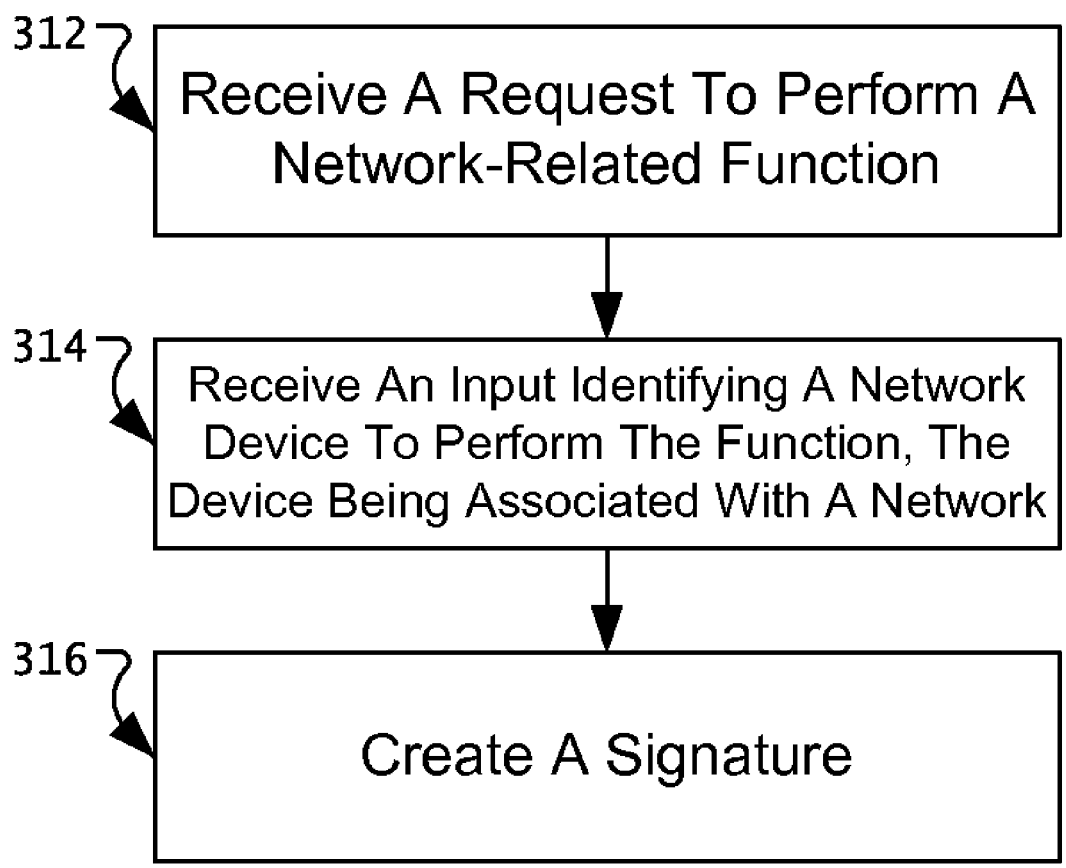
FIG. 3B is a flow diagram showing an alternative process for creating a signature.

FIG. 3B is a flow diagram showing an alternative process 310 for creating a signature. Similar to process 300, process 310 may be performed, for example, by the network management module 200, and for clarity of presentation, the description that follows uses these as the basis of examples for describing the process 310. However, another module, or combination of modules/engines, also may be used to perform the process 310.

Referring to FIG. 3B, the process 310 may begin with receiving a request to perform a network-related function (312). In some implementations, the network-related function may include performing a print job using a printer connected to an existing network, transferring files to a storage device connected to the network for storage, retrieving a voice mail from a voice mailbox connected to the network, and the like.

Process 310 may receive an input identifying a network device to perform the network-related function, the network device being associated with a network (314). For example, process 310 may identify a specific printer, a specific scanner, or a specific server. Process 310 then creates a signature based on one or more properties associated with the network device (316).

Figure 3C:
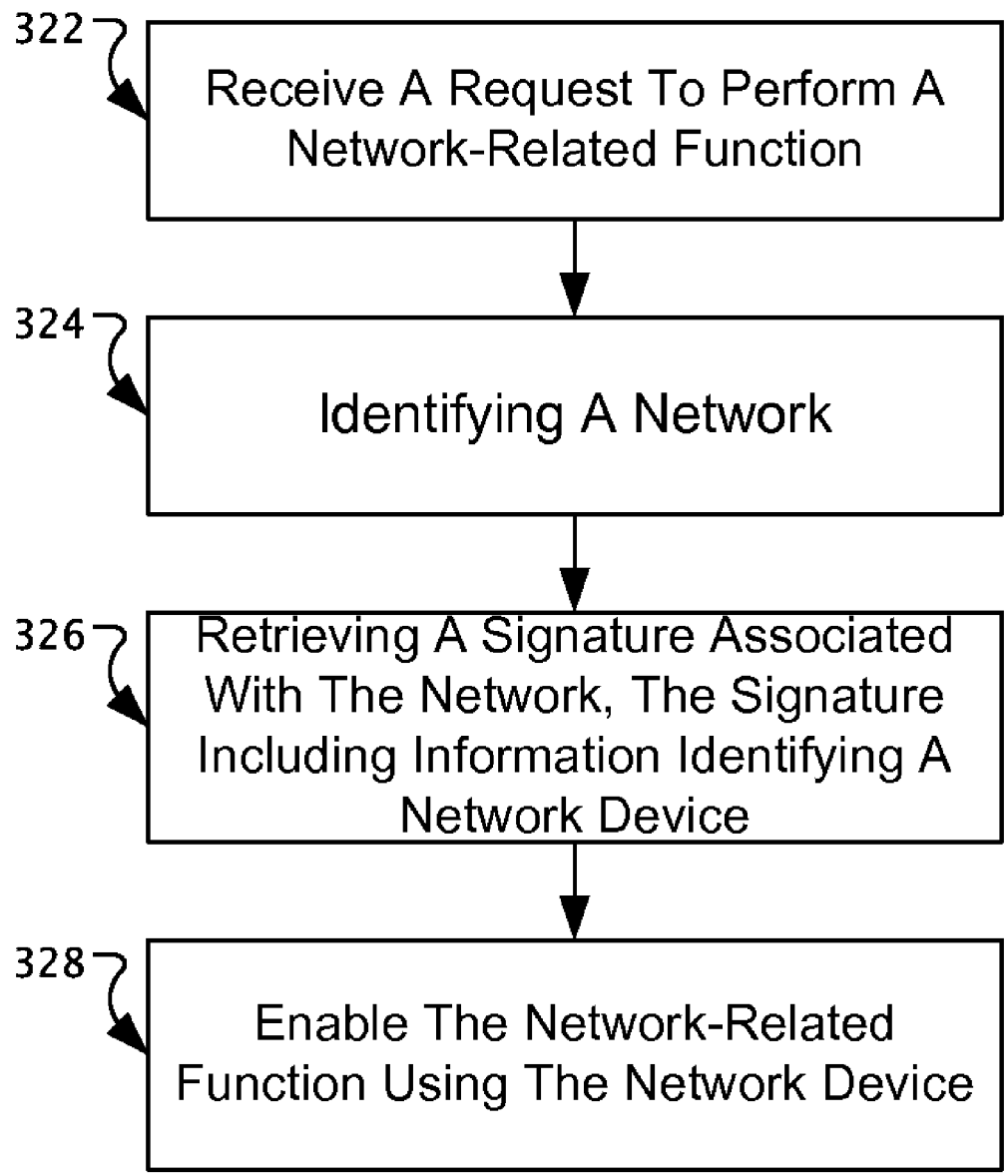
FIG. 3C is a flow diagram showing an example process for enabling a network-related function using a signature.

FIG. 3C is a flow diagram showing an example process 320 for enabling a network-related function using a signature. Again, similar to processes 300 and 310, process 320 may be performed, for example, by the network management module 200, and for clarity of presentation, the description that follows uses these as the basis of examples for describing the process 320. However, another module, or combination of modules/engines, also may be used to perform the process 320.

Process 320 receives a request to perform a network-related function (322). In some implementation, prior to retrieving a signature, a network on which the network-related function is to be performed is identified (324). Then, the signature associated with the network is retrieved, where the signature includes information identifying a network device (326). Consequently, process 320 enables the network-related function using the network device.

Hardware System

Figure 4:
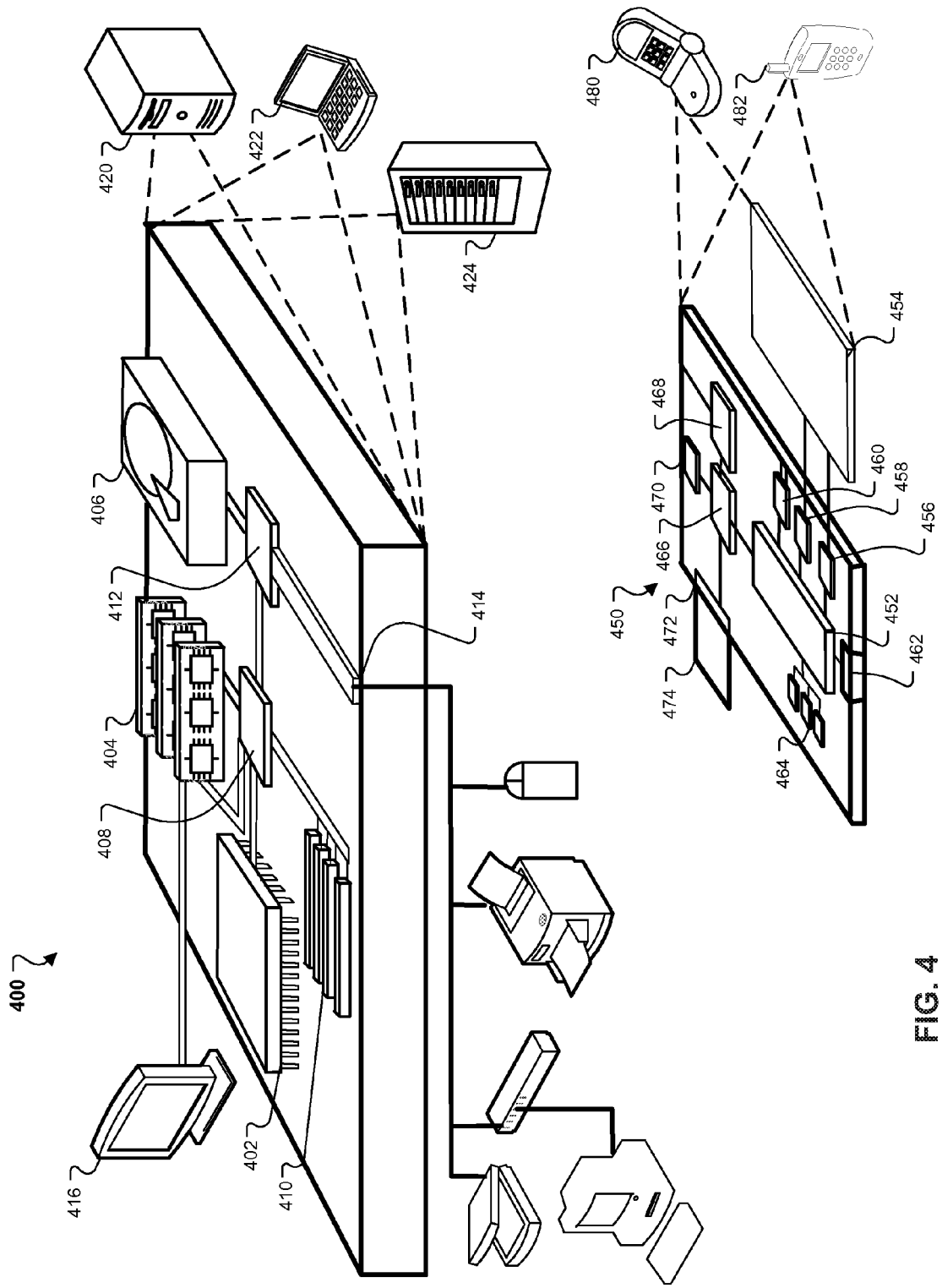
FIG. 4 is a block diagram showing an example of computing devices and systems, which can be configured to implement the processes shown in FIGS. 3A-3C.
Like reference symbols in the various drawings indicate like elements.

FIG. 4 is a block diagram of computing devices and systems 400 and 450, which can be configured to implement the processes shown in FIGS. 3A-3C. The devices and systems 400 and 450 can be used for the operations described in association with the processes and implementations described above. For example, the devices and systems 400 and 450 may be included in either or all of the computing system 102, and/or network devices 104a-c, 106a-c and 108a-b.

Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and can be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422.

Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes a processor 452, memory 464, an input/output device such as a display 454, a communication interface 466, and a transceiver 468, among other components. The device 450 can also be provided with a storage device, such as a microdrive or other device, to provide additional storage. Each of the components 450, 452, 464, 454, 466, and 468, are interconnected using various buses, and several of the components can be mounted on a common motherboard or in other manners as appropriate.

The processor 452 can process instructions for execution within the computing device 450, including instructions stored in the memory 464. The processor can also include separate analog and digital processors. The processor can provide, for example, for coordination of the other components of the device 450, such as control of user interfaces, applications run by device 450, and wireless communication by device 450.

Processor 452 can communicate with a user through control interface 458 and display interface 456 coupled to a display 454. The display 454 can be, for example, a TFT LCD display or an OLED display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can be provide in communication with processor 452, so as to enable near area communication of device 450 with other devices. External interface 462 can provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 can also be provided and connected to device 450 through expansion interface 472, which can include, for example, a SIMM card interface. Such expansion memory 474 can provide extra storage space for device 450, or can also store applications or other information for device 450. Specifically, expansion memory 474 can include instructions to carry out or supplement the processes described above, and can include secure information also. Thus, for example, expansion memory 474 can be provided as a security module for device 450, and can be programmed with instructions that permit secure use of device 450. In addition, secure applications can be provided via the SIMM cards, along with additional information, such as placing identifying information on the SIMM card in a non-hackable manner.

The memory can include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth, WiFi, or other such transceiver (not shown). In addition, GPS receiver module 470 can provide additional wireless data to device 450, which can be used as appropriate by applications running on device 450.

Device 450 can also communicate audibly using audio codec 460, which can receive spoken information from a user and convert it to usable digital information. Audio codex 460 can likewise generate audible sound for a user, such as through a speaker, e.g., in a handset of device 450. Such sound can include sound from voice telephone calls, can include recorded sound (e.g., voice messages, music files, etc.) and can also include sound generated by applications operating on device 450.

The computing device 450 can be implemented in a number of different forms, as shown in the figure. For example, it can be implemented as a cellular telephone 480. It can also be implemented as part of a smartphone 482, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Also, it will be understood that various modifications may be made. For example, elements of one or more implementations may be combined, deleted, modified, or supplemented to form further implementations. Additionally, in further implementations, an engine 110-190 need not perform all, or any, of the functionality attributed to that engine in the implementations described above, and all or part of the functionality attributed to one engine 110-190 may be performed by another engine, another additional module, or not performed at all.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Accordingly, other implementations are within the scope of the following claims.

What is claimed is:

1. A method executed by a data processing apparatus, the method comprising:
    receiving a setting specifying a remote device for use by an application executing on the data processing apparatus;
    determining that the data processing apparatus is connected to a first network, the first network including a gateway and a first client device connected to the gateway, the first client device being different from the data processing apparatus;
    based on the setting and the determining, designating the first client device as the remote device for use by the application;
    detecting that a change of networks has occurred, wherein after the change, the data processing apparatus is connected to a second network, the second network including a gateway and a second client device connected to the gateway, the second client device being different from the data processing apparatus; and based on the setting and the detecting, designating, without user intervention, the second client device as the remote device for use by the application.

2. The method of claim 1, wherein determining that the data processing apparatus is connected to the first network comprises determining that a signature of the first network matches a pre-stored signature, the signature being created based on one or more properties associated with the gateway of the first network and the first client device of the first network.

3. The method of claim 2, comprising creating the signature, wherein creating the signature includes obtaining configuration information from the gateway of the first network or the first client device.

4. The method of claim 2, wherein the one or more properties include one or more of the following properties: a connection method, a network address, a network mask, a gateway address, a connection name, a network profile, a domain name, network setting information, or device information.

5. The method of claim 3, where creating the signature comprises:
receiving a request to perform a network-related function;
receiving an input identifying the first client device for performing the network-related function; and
creating a signature unique to the first network, the signature including one or more properties associated with the gateway and one or more properties associated with the first client device.

6. The method of claim 5, where creating the signature further comprises:
obtaining network and adaptor configuration information from the first client device;
requesting a list of properties to be used for creating the signature from the first client device; and
receiving the list from the first client device in response to the request.

7. The method of claim 5, where the network-related function includes one or more of the following: performing a print job using a printer connected to an existing network, transferring files to a storage device connected to the network for storage, retrieving a voice mail from a voice mailbox connected to the network.

8. A data processing apparatus system comprising:
a processor;
a computer-readable medium coupled to the processor and storing instructions which, when executed by the processor, cause the processor to perform operations comprising:
receiving a setting specifying a remote device for use by an application executing on the data processing apparatus;
determining that the data processing apparatus is connected to a first network, the first network including a gateway and a first client device connected to the gateway, the first client device being different from the data processing apparatus;
based on the setting and the determining, designating the first client device as the remote device for use by the application;
detecting that a change of networks has occurred, wherein after the change, the data processing apparatus is connected to a second network, the second network including a gateway and a second client device connected to the gateway, the second client device being different from the data processing apparatus; and
based on the setting and the detecting, designating, without user intervention, the second client device as the remote device for use by the application.

9. The data processing apparatus system of claim 8, wherein determining that the data processing apparatus is connected to the first network comprises determining that a signature of the first network matches a pre-stored signature, the signature being created based on one or more properties associated with the gateway of the first network and the client device of the first network.

10. The data processing apparatus of claim 9, comprising creating the signature, wherein creating the signature includes obtaining configuration information from the gateway of the first network or the first client device.

11. The data processing apparatus of claim 9, wherein the properties include one or more of the following properties: a connection method, a network address, a network mask, a gateway address, a connection name, a network profile, a domain name, network setting information, or device information.

12. The data processing apparatus of claim 10, where creating the signature comprises:
receiving a request to perform a network-related function;
receiving an input identifying the first client device for performing the network-related function; and
creating a signature unique to the first network, the signature including one or more properties associated with the gateway of the first network and one or more properties associated with the first client device.

13. The data processing apparatus of claim 12, further comprising storing each signature on the computer-readable medium.

14. A computer program product tangibly stored on a storage device, operable to cause data processing apparatus to perform operations comprising:
receiving a setting specifying a remote device for use by an application executing on the data processing apparatus;
determining that the data processing apparatus is connected to a first network, the first network including a gateway and a first client device connected to the gateway, the first client device being different from the data processing apparatus;
based on the setting and the determining, designating the first client device as the remote device for use by the application;
detecting that a change of networks has occurred, wherein after the change, the data processing apparatus is connected to a second network, the second network including a gateway and a second client device connected to the gateway, the second client device being different from the data processing apparatus; and
based on the setting and the detecting, designating, without user intervention, the second client device as the remote device for use by the application.

15. The product of claim 14, wherein determining that the data processing apparatus is connected to a first network comprises determining that a signature of the first network matches a pre-stored signature, the signature being created based on one or more properties associated with the gateway of the first network and the client device of the first network, the operations further comprising storing the signature on a storage device of the data processing apparatus.

16. The product of claim 15, wherein the one or more properties include one or more of the following properties: a connection method, a network address, a network mask, a gateway address, a connection name, a network profile, a domain name, network setting information, or device information.

17. The product of claim 14, wherein specifying the remote device for use by the application includes specifying the remote device as a default device of the application.

18. The product of claim 17, wherein the remote device is a network printer.

19. The method of claim 1, wherein specifying the remote device for use by the application includes specifying the remote device as a default device of the application.

20. The method of claim 19, wherein the remote device is a network printer.

21. The data processing apparatus of claim 8, wherein specifying the remote device for use by the application includes specifying the remote device as a default device of the application.

22. The data processing apparatus of claim 21, wherein the remote device is a network printer.

* * * * *